United States Patent [19]

Green et al.

[11] Patent Number: 5,753,284
[45] Date of Patent: May 19, 1998

[54] COMBINATION DRINKING STRAW AND EDIBLE PLUG

[75] Inventors: Richard Green, Spruce Grove; Murray Fierheller, Edmonton, both of Canada

[73] Assignee: Paradis Honey Ltd., Girouxville, Canada

[21] Appl. No.: 647,595

[22] Filed: May 13, 1996

[51] Int. Cl.$^6$ ................................................ A23G 3/00
[52] U.S. Cl. .................. 426/85; 426/115; 426/132; 426/659; 426/660; 426/394; 426/420
[58] Field of Search ............................ 426/104, 103, 426/85, 86, 112, 115, 132, 134, 659, 394, 420, 660

[56] References Cited

U.S. PATENT DOCUMENTS

| | | | |
|---|---|---|---|
| 943,945 | 12/1909 | Liebich | 426/103 |
| 1,254,115 | 1/1918 | Brand | 426/85 |
| 1,484,016 | 2/1924 | Fisher | 426/138 |
| 1,502,207 | 7/1924 | Paine et al. | 426/103 |
| 1,758,089 | 5/1930 | Shirriff | 426/103 |
| 1,810,453 | 6/1931 | Webster et al. | 426/85 |
| 2,102,920 | 12/1937 | Savage | 426/85 |
| 2,531,536 | 11/1950 | Silver | 426/103 |
| 3,275,448 | 9/1966 | Sommer | 426/115 |
| 3,545,980 | 12/1970 | Stanger | 426/85 |
| 3,610,483 | 10/1971 | Visconti | 426/85 |
| 3,824,322 | 7/1974 | Fiorella | 426/86 |
| 4,229,482 | 10/1980 | Kreske | 426/85 |
| 4,260,596 | 4/1981 | Mackles | 426/103 |
| 4,372,942 | 2/1983 | Cimiluca | 426/103 |
| 4,517,205 | 5/1985 | Aldrich | 426/103 |
| 5,125,534 | 6/1992 | Rose et al. | 426/112 |

FOREIGN PATENT DOCUMENTS

| | | | |
|---|---|---|---|
| 2046246 | 7/1991 | Canada . | |
| 2572623 | 5/1986 | France . | |
| 2503351 | 7/1976 | Germany | 426/115 |

OTHER PUBLICATIONS

Candy, Time–Life Books, 1981, pp. 8–11, 21–27, 30–35, 88.
Up–To–Date Confectionary, 4th Ed., Daniel, Maclaren & Sons pp. 429–440, 1965.
Candy Technology, Alikonis, Avi Publishing pp. 120–122, 244–249, 258, 1979.
Choice Confections, Manufacturing Methods & Formulas, Richmond, Manufacturing Confectioner Pub. Co. pp. 48, 49, 353–355, 1954.

*Primary Examiner*—Steven Weinstein
*Attorney, Agent, or Firm*—Anthony R. Lambert

[57] ABSTRACT

A combination drinking straw and edible plug, the edible plug includes a body formed of a fondant mixture containing water, glucose and sucrose. There is not less than 30 parts of glucose and not more than 220 parts of glucose for every 100 parts of sucrose. The body has not less than 2% water and not more than 6% water by weight.

5 Claims, No Drawings

5,753,284

COMBINATION DRINKING STRAW AND EDIBLE PLUG

FIELD OF THE INVENTION

The present invention relates to an edible plug and in particular, an edible plug suitable for sealing a tube containing liquid nourishment, and a method of making the same.

BACKGROUND OF THE INVENTION

Canadian Patent Application 2,046,246 filed by Chen-Sung Li et al and published Jan. 5, 1993 entitled "a disposable spoon", discloses a tube with one end shaped to form a spoon. The tube is filled with condiment and sealed at one end by what is described as a "soluble and edible sealer". In the patent application examples are given as to the types of condiments that might be dispensed by such a spoon, namely; "sugar, juice powder, coffee mate (a trademark) with sugar, coffee mate with coffee powder, coffee mate with sugar and coffee powder", and the like. The patent application also provides a description of suitable plugs, namely; "glutinous rice film, solid syrup, edible paste" and the like.

Apparently, plugs made from glutinous rice film, solid syrup and edible paste, work satisfactorily when the condiment being sealed is in granular form. When one endeavours to use these plugs on tubes containing liquid nourishment, however, problems are encountered.

In experiments, rice plugs were produced as suggested by the Li reference. The rice plugs were produced by heating a rice flour and a water slurry to 85 degrees celsius. Sugar at 15% by weight was added for flavour. The plug was inserted into a straw evaluated over a six week period for signs of leakage. Although a variety of formulations were tried using from 15% to 25% rice flour, none of the rice flour plugs provided an effective seal, so as to prevent leakage. Attempts at using rice flour content of over 25% proved futile, as in higher concentrations the rice flour proven virtually impossible to work with. The rice flour plugs were not shelf stable, as the moisture content was sufficient to support the growth of micro-organisms.

In experiments, sucrose and water were combined and boiled to form a solid syrup as suggested by Li. Great care had to be taken as to the temperature of the syrup at the time of formation of the plug, as it tended to melt the straws. In addition, the syrups tended to crystallize, which rendered them unsuitable.

In experiments, an edible paste was prepared in accordance with fondant recipes found in recipe books. When this edible paste was used to seal the straws, it was found that the edible paste did not solidify sufficiently to seal the straws against leakage.

Experiments were similarly conducted with other forms of plugs. It was determined that Gelatin plugs shrank considerably and would not form a seal with the straw. It was determined that jelly bean-like mixtures were so sticky and elastic, that they could not be made into an effective plug. It was determined that beeswax plugs exhibited signs of shrinkage during storage. This shrinkage could not be eliminated even with the introduction of chemicals (glycerol, myvacet, starches, xanthan gum and hydrogen peroxide) intended to reduce the shrinkage phenomena. A high temperature melting chocolate was tested with a melting point of 36 to 38 degrees celsius. It was determined that leakage started to occur due to a softening of the chocolate after one week.

SUMMARY OF THE INVENTION

What is required is an edible plug suitable for use in sealing a straw containing liquid nourishment.

According to one aspect of the present invention there is provided an edible plug which includes a body formed of a fondant mixture containing water, glucose and sucrose. There is not less than 30 parts of glucose and not more than 220 parts of glucose for every 100 parts of sucrose. The body has not less than 2% water and not more than 6% water by weight.

Although beneficial results may be obtained through the use of the edible plug, as described above, even more beneficial results may be obtained when the glucose content is in a narrower range of not less than 54 parts of glucose and not more than 74 parts of glucose for every 100 parts of sucrose.

According to another aspect of the present invention there is provided a method of preparation of an edible plug. Firstly, mixing water, glucose and sucrose to form a starting mixture having not less than 30 parts of glucose and not more than 220 parts of glucose for every 100 parts of sucrose. Secondly, boiling the mixture at not less than 120 degrees celsius and not more than 160 degrees celsius until the water content is reduced to not less than 2% and not more than 6% by weight of an end mixture.

Although beneficial results may be obtained through the use of the method, as described above, even more beneficial results may be obtained when a narrower temperature range of not less than 135 degrees celsius and not more than 146 degrees celsius is used.

Although beneficial results may be obtained through the use of the method, as described above, even more beneficial results may be obtained when mixing glucose in a narrower range of not less than 54 parts of glucose and not more than 74 parts of glucose for every 100 parts of sucrose.

DETAILED DESCRIPTION OF THE PREFERRED EMBODIMENT

Preferred embodiments of edible plug will now be described.

The edible plug is made out of a fondant mixture that has been hardened. Fondant mixtures, generally, as too soft and unsuitable for use as a plug. The fact that fondant, formulated as will hereinafter be described, to be suitable is somewhat surprising.

If a fondant mixture is "too soft" it does not form a suitable seal. Conversely, if the fondant mixture is "too hard" it is very difficult to remove. The softness or hardness of a fondant is an indication of its moisture content. Temperature is used to control the production process, as it is easier to monitor than moisture content. The temperature ranges hereinafter described provide a moisture content within the above operative sealing range.

When preparing the fondant, water, sucrose, and glucose are mixed. Sucrose is nothing more than crystallized sugar, and serves as the main sugar in the fondant. When used alone however, Sucrose crystallizes making it totally unsuitable for use as a plug. In order to prevent such crystallization, the glucose is to be added. When the amount of glucose in the starting mixture by weight is less than 20% glucose, the glucose content is not sufficient to prevent crystallization. When the amount of glucose in the starting mixture by weight is more than 55% glucose the plug becomes like hard rock candy and is extremely difficult to remove. As the glucose content decreases from 28% toward 20%, the quality of the plug decreases. As the glucose content increases from 34% toward 55% the plug becomes progressively harder and more difficult to remove. It is, therefore, preferred that the glucose range be consistently maintained of between 28% and 34%.

The percentage content of sucrose in the starting mixture is determined by the amount of water and glucose used. Most of the water is boiled away. It has been found that at least 20% by weight of water is usually required in order to dissolve the Sucrose. In the end product, however, the fondant has a moisture content of not less than 2% and not more than 6% of water by weight. This results in a fondant end product having not less than 43% sucrose and not more than 78% sucrose by weight.

Temperature is used to control the moisture content of the edible plug. The method of preparation of the edible plug involved the following steps. Firstly, a mixture of water, glucose and sucrose was prepared. Insofar as the glucose and sucrose is concerned, the glucose content is within the preferred range of not less than 28% by weight and not more than 34% by weight. The water content starts at 20% by weight and decreases during processing to the preferred range of not less than 2% and not more than 6%. Secondly, the mixture was boiled. At boiling temperatures of less than 120 degrees celsius the fondant does not harden. At boiling temperatures in excess of 160 degrees celsius the fondant is formed into a rock hard candy plug that is extremely difficult to remove. The quality of the plug tends to progressively increase as the boiling temperature is increased from 120 degrees. In terms of plug quality, it is preferred that the mixture be boiled within a narrower temperature range of not less than 135 degrees celsius and not more than 146 degrees celsius until the water content was reduced to not less than 2% and not more than 6% by weight. Temperatures between 146 degrees celsius and 160 degrees celsius provide beneficial results, but not as beneficial as in the preferred temperature range of 135 degrees celsius to 146 degrees celsius. Once the mixture has reached the target temperature range, it can be determined when the batch is done through various means, such as through the use of a viscosity meter.

In view of the fact that the water content changes, the relative proportions of glucose and sucrose can be alternatively stated. The broad range described above constitutes not less than 30 parts and not more than 220 parts glucose for every 100 parts of sucrose. The narrower preferred range amount constitutes not less than 54 parts and not more than 79 parts glucose for every 100 parts of sucrose. These parts of sucrose and glucose are all parts by weight.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method of preparation of an edible plug for sealing an end of a drinking straw containing liquid nourishment, comprising the steps of:
    firstly, mixing water, glucose and sucrose to form a starting mixture having not less than 30 parts of glucose and not more than 220 parts of glucose for every 100 parts of sucrose; and
    secondly, boiling the mixture at not less than 120 degrees celsius and not more than 160 degrees celsius until the water content is reduced to not less than 2% and not more than 6% by weight of the boiled mixture; and
    thirdly, applying the boiled mixture to an open end of a drinking straw containing liquid nourishment to seal the open end.

2. The method as defined in claim 1, wherein said boiling is at a temperature range of not less than 135 degrees celsius and not more than 146 degrees celsius.

3. The method as defined in claim 1, wherein said boiling is at a temperature range of not less than 54 parts of glucose and not more than 74 parts of glucose for every 100 parts of sucrose.

4. In combination:
    a drinking straw containing liquid nourishment having an open end; and
    an edible plug sealing the open end of the drinking straw, the edible plug, comprising:
        a body formed of a fondant mixture containing water, glucose and sucrose;
        said fondant mixture having a not less than 30 parts of glucose and not more than 220 parts of glucose for every 100 parts of sucrose;
        said fondant mixture having been boiled at not less than 120 degrees celcius and not more than 160 degrees celcius until the water content of the fondant mixture and the body formed therefrom is not less than 2% water and not more than 6% water by weight.

5. The edible plug as defined in claim 4, wherein the glucose content of the fondant mixture is not less than 54 parts of glucose and not more than 74 parts of glucose for every 100 parts of sucrose.

* * * * *

UNITED STATES PATENT AND TRADEMARK OFFICE
CERTIFICATE OF CORRECTION

PATENT NO. : 5,753,284
DATED : May 19, 1998
INVENTOR(S) : Richard Green and Murray Fierheller It is certified that error appears in the above-indentified patent and that said Letters Patent is hereby corrected as shown below:

Column 4, line 24-27, are amended to read
"3. The method as defined in Claim 1, wherein said glucose is mixed in a range of not less than 54 parts of glucose and not more than 74 parts of glucose for every 100 parts of sucrose."

Signed and Sealed this

Third Day of October, 2000

Attest:

Q. TODD DICKINSON

*Attesting Officer*  *Director of Patents and Trademarks*